US009834684B2

(12) United States Patent
Wang et al.

(10) Patent No.: US 9,834,684 B2
(45) Date of Patent: Dec. 5, 2017

(54) NATURAL AMORPHOUS SILICA FILLER PRODUCTS

(75) Inventors: Bo Wang, Lompoc, CA (US); Michael Greene, Santa Barbara, CA (US); Rajendra Kashinath Singh, Lompoc, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 0 days.

(21) Appl. No.: 13/255,530

(22) PCT Filed: Mar. 9, 2010

(86) PCT No.: PCT/US2010/026627
§ 371 (c)(1),
(2), (4) Date: Nov. 10, 2011

(87) PCT Pub. No.: WO2010/104831
PCT Pub. Date: Sep. 16, 2010

(65) Prior Publication Data
US 2012/0048145 A1   Mar. 1, 2012

Related U.S. Application Data

(60) Provisional application No. 61/159,208, filed on Mar. 11, 2009, provisional application No. 61/169,186, filed on Apr. 14, 2009.

(51) Int. Cl.
*C09C 1/28* (2006.01)
*C09C 1/30* (2006.01)

(52) U.S. Cl.
CPC ................. *C09C 1/28* (2013.01); *C09C 1/30* (2013.01); *C09C 1/3009* (2013.01);
(Continued)

(58) Field of Classification Search
None
See application file for complete search history.

(56) References Cited

U.S. PATENT DOCUMENTS

| 1,992,547 A | 2/1935 | Schuetz |
| 2,431,884 A | 12/1947 | Neuschotz |

(Continued)

FOREIGN PATENT DOCUMENTS

| CA | 890249 | 1/1972 |
| CN | 86 1 07500 B | 9/1987 |

(Continued)

OTHER PUBLICATIONS

Klug, Harold P. and Alexander, Leroy E., "X-Ray Diffraction Procedures for Polycrystalline and Amorphous Materials", $2^{nd}$ Ed. 1972, pp. 531-565.

(Continued)

*Primary Examiner* — Kaj K Olsen
*Assistant Examiner* — Ross J Christie
(74) *Attorney, Agent, or Firm* — Finnegan, Henderson, Farabow, Garrett & Dunner LLP

(57) ABSTRACT

Natural amorphous silica filler products featuring high brightness, low oil absorption, fine particle size, and low crystalline silica content are described. Methods for making, using, and measuring the properties of the natural amorphous silica filler products are also described. The natural amorphous silica filler products described herein may be useful in a variety of products including, but not limited to, polymers, sealants, paints, caulks, latex, architectural coatings, industrial coatings, pozzolan, glass catalysts, ceramic glazes, and anti-blocking applications.

26 Claims, 5 Drawing Sheets

An SEM Image of AF Silica 1974 Fines Under 6000x Magnification

(52) U.S. Cl.
CPC ........ *C09C 1/3081* (2013.01); *C01P 2004/03* (2013.01); *C01P 2004/51* (2013.01); *C01P 2004/61* (2013.01); *C01P 2006/12* (2013.01); *C01P 2006/14* (2013.01); *C01P 2006/19* (2013.01); *C01P 2006/62* (2013.01); *C01P 2006/63* (2013.01); *C01P 2006/64* (2013.01)

(56) References Cited

U.S. PATENT DOCUMENTS

| | | | |
|---|---|---|---|
| 2,504,357 A | | 4/1950 | Swallen |
| 2,602,782 A | | 7/1952 | Zoradi |
| 2,701,240 A | | 2/1955 | Bregar |
| 2,886,460 A | * | 5/1959 | Alexander ............ 106/490 |
| 3,053,792 A | * | 9/1962 | Ikeda ............ 524/849 |
| 3,233,740 A | | 2/1966 | Vander Linden et al. |
| 3,375,922 A | | 4/1968 | Martin et al. |
| 3,547,260 A | | 12/1970 | Munn |
| 3,915,735 A | | 10/1975 | Moreland |
| 3,960,586 A | | 6/1976 | Wason |
| 4,134,857 A | | 1/1979 | Bradley et al. |
| 4,142,968 A | | 3/1979 | Nielsen et al. |
| 4,175,158 A | | 11/1979 | Saunders |
| 4,260,498 A | | 4/1981 | Sample, Jr. et al. |
| 4,325,844 A | | 4/1982 | Olmsted, Jr. |
| 4,509,064 A | * | 4/1985 | Usui et al. ............ 106/492 |
| 4,544,604 A | * | 10/1985 | Usui et al. ............ 428/402 |
| 4,617,128 A | | 10/1986 | Ostreicher |
| 4,891,394 A | * | 1/1990 | Savin ............ 523/442 |
| 5,009,906 A | | 4/1991 | Smith |
| 5,035,804 A | | 7/1991 | Stowe |
| 5,098,938 A | * | 3/1992 | Savin ............ 523/220 |
| 5,153,063 A | | 10/1992 | Okita et al. |
| 5,179,062 A | * | 1/1993 | Dufour ............ 502/412 |
| 5,236,683 A | | 8/1993 | Nakazawa et al. |
| 5,418,043 A | | 5/1995 | Ogawa et al. |
| 5,656,568 A | | 8/1997 | Shiuh et al. |
| 5,852,096 A | | 12/1998 | Heindl et al. |
| 6,004,899 A | * | 12/1999 | Tachizawa ............ B41M 5/305 428/405 |
| 6,074,474 A | | 6/2000 | Broome et al. |
| 6,140,040 A | | 10/2000 | Palm et al. |
| 6,241,994 B1 | * | 6/2001 | Lee et al. ............ 424/408 |
| 6,464,770 B1 | | 10/2002 | Palm et al. |
| 6,653,255 B2 | | 11/2003 | Shiuh et al. |
| 6,712,898 B2 | | 3/2004 | Palm et al. |
| 6,773,770 B1 | * | 8/2004 | Sugiyama et al. ......... 428/32.34 |
| 7,497,903 B2 | | 3/2009 | Wang et al. |
| 2003/0154882 A1 | | 8/2003 | Nagata et al. |
| 2004/0234228 A1 | * | 11/2004 | Mune et al. ............ 385/142 |
| 2005/0027098 A1 | * | 2/2005 | Hayes ............ 528/272 |
| 2007/0066737 A1 | | 3/2007 | Gallucci et al. |
| 2007/0066738 A1 | | 3/2007 | Gallucci et al. |
| 2007/0100088 A1 | | 5/2007 | Gallucci et al. |
| 2007/0125269 A1 | * | 6/2007 | Nishi ............ 106/481 |
| 2008/0153694 A1 | * | 6/2008 | Nishi et al. ............ 502/401 |
| 2009/0029171 A1 | * | 1/2009 | Danvers ............ 428/405 |

FOREIGN PATENT DOCUMENTS

| | | |
|---|---|---|
| CN | 1044233 A | 8/1990 |
| CN | 1053564 A | 8/1991 |
| CZ | 128699 | 2/1968 |
| CZ | 128894 | 2/1968 |
| DE | 469606 | 12/1928 |
| DE | 1 052 964 | 3/1959 |
| EP | 0 513 975 A1 | 11/1992 |
| EP | 0 758 560 A1 | 2/1997 |
| FR | 377086 | 8/1907 |
| FR | 2 586 588 A1 | 3/1987 |
| FR | 2 663 564 A1 | 12/1991 |
| GB | 5379 | 0/1907 |
| GB | 341060 | 1/1931 |
| GB | 2 245 265 A | 1/1992 |
| IT | 487158 | 11/1953 |
| IT | 529036 | 6/1955 |
| JP | 33-4414 | 6/1958 |
| JP | 46-7563 | 2/1971 |
| JP | 1-153564 A | 6/1989 |
| JP | 08-019702 A | 1/1996 |
| JP | 2000-160013 A | 6/2000 |
| WO | WO 2006/036151 A1 | 4/2006 |
| WO | WO 2010/104831 A1 | 9/2010 |

OTHER PUBLICATIONS

International Search Report and Written Opinion dated May 11, 2010, in International Application No. PCT/US2010/026627 filed Mar. 9, 2010.
Extended European Search Report for European Patent Application No. 10 751 269, dated Apr. 7, 2014.
American Society for Testing and Materials Designation D 882-02, "Standard Test Method for Tensile Properties of Thin Plastic Sheeting" (2002).
American Society for Testing and Materials Designation D 1003-00, "Standard Test Method for Haze and Luminous Transmittance of Transparent Plastics" (2000).
American Society for Testing and Materials Designation D 1238-00, "Standard Test Method for Melt Flow Rates of Thermoplastics by Extrusion Plastometer" (2001).
American Society for Testing and Materials Designation D 2457-97, "Standard Test for Specular Gloss of Plastic Films and Solid Plastics" (1997).
American Society for Testing and Materials Designation D 3354-96, "Standard Test for Blocking Load of Plastic Film by the Parallel Plate Method" (1996).
American Society for Testing and Materials Designation D 5630-01, "Standard Test Method for Ash Content in Plastics" (2001).
American Society for Testing and Materials Designation E 313-00, "Standard Practice for Calculating Yellowness and Whiteness Indices from Instrumentally Measured Color Coordinates" (2001).
Baly, E. C. C. ; Pepper, W. P.; and Vernon, C. E., "THH Adsorption of the Hydrous Metallic Oxides by Kieselguhr," 35 Trans. Faraday Soc., 1939, pp. 1165-1175.
Bear, Jacob, "Dynamics of Fluids in Porous Media" American Elsevier Publishing Company, Inc., 1988, pp. 161-176.
Berry, L. G., and Mason, Brian, "Appendix A: Natural Glasses and Macerals," Mineralogy, 2d. ed., 1983, pp. 540-546.
Bhirud, Y. B., and Shetty, S. S., "Role of Classification in Powder Coating Paint Production," vol. 34, No. 1. Chemical Engineering World, 1999, pp. 61-62—XP-002468935.
Breese, Richard O. Y., "Diatomite," Industrial Minerals and Rocks, 6th ed., 1994, pp. 397-412.
Breese, Richard O. Y., and Barker, James M., "Perlite," Industrial Minerals and Rocks, 6th ed., 1994, pp. 735-749.
Brozek, Marian; Malysa, Ewa; Oruba, Ewa; and Sanak-Rydlewska, Stanislawa, "Enrichment of Carpathian Diatomites by the Flotation-Chemical Method," No. 7, 1992, pp. 1-20.
Huaizhi Cai, Shixong Bao, & Chongguang Wang, "Experimental Research on Purification of Sichuan Miyi Diatomite," 6 Kuangchan Zonghe Liyong 1-8 (1992).
Cain Jr., C.W., "Filter Aid, Use in Filtration," Encyclopedia of Chemical Processing and Design, 1984, pp. 348-372.
Carman, P. C., "Fluid Flow Through Granular Beds," Transactions of the Institution of Chemical Engineers, vol. 15, 1937, pp. 150-166.
Cheremisinoff, Nicholas P., "Low Density Polyethylene (LDPE)," Condensed Encyclopedia of Polymer Engineering Terms, 2001, p. 157.
Engh, Kenneth R., "Diatomite," Kirk-Othmer Encyclopedia of Chemical Technology, vol. 8, 1994, pp. 108-118.
Filho, Franz Xaver Horn, and Da Veiga, Marcell Mariz, "Processing of Diatomite from Canavieira in the State of Ceará," 1980, pp. 1-23.
Gruder, G., Calusaru, A., and Raducanu, C., "Beneficiation of Some Natural Materials by the Electrochemical Method," Communication I, Diatomites and Kaolins, 1958, Revista de Chimie, pp. 361-366.
Kadey Jr., Frederic L., "Diatomite," Industrial Minerals and Rocks, vol. 1, 1983, pp. 677-708.

(56) References Cited

OTHER PUBLICATIONS

Heertjes, P. M., and Haas, H. v. d., "Studies in Filtration: Part I", Recueil des Travaux Chimiques des Pays-Bas, 1949, vol. 68, No. 6, pp. 361-383.
Heertjes, P. M., and Lerk, C. F., "Filter Blocking, Filter Media and Filter Aids," Solid-Liquid Separation, Chemical Publishing Company, Inc, 1968, pp. 37-43.
Hermanson, Greg T.; Mallia, A. Krishna, and Smith, Paul K., Immobilized Affinity Ligand Techniques, Academic Press, Inc., 1992, pp. 1-50.
Keifer, J., "Kieselguhr Filtration, Overview of Theoretical Principles," Brauwelt International, 1991., vol. IV, pp. 300-309.
Fengjuan Li, "Study of Kieselguhr Purification by Acid Processing," 1989 (3) Feijinshukuang 27-28 & 43 (1990).
Marcus, D., and Creanga, Laura, "Obtaining Higher Grades of Diatomite for Filtering and Filling," 1964, vol. 15 No. 11, Revista de Chimie pp. 1-22.
Marcus, D., "Studies on the Deferrization of Some Diatomites and the Quality of the Products Obtained", 1967, vol. 18 No. 6, Revista de Chimie, pp. 1-18.
Nordén, Harry V., and Kauppinen, Petteri, "Application of Volume Balances and the Differential Diffusion Equation to Filtration", Separation Science and Technology, 1994, vol. 29, No. 10, pp. 1319-1334.
Norman, James, and Ralston, Oliver C., "Purification of Diatomite by Froth Flotation," American Institute of Mining and Metallurgical Engineers, Technical Publication No. 1198, 1940, pp. 1-11.
Ruth, B. F., "Correlating Filtration Theory with Industrial Practice", Industrial and Engineering Chemistry, 1946, vol. 38, No. 6, pp. 564-571.
Sperry, D. R., "The Principles of Filtration", Metallurgical and Chemical Engineering, vol. 15, No. 1, 1916, pp. 198-203.
Stein, H. A., and Murdock, J. B., "The Processing of Perlite", California Journal of Mines & Geology, vol. 51, No. 2, 1955, pp. 105-116.
Tarhanic, Ladislav, and Kortisova, Tatiana, "Processing Diatomaceous Earth from the Mociar Deposit in Heavy Suspensions", vol. 21, No. 5, 1979, pp. 1-10.
Tiller, F. M., "The Role of Porosity in Filtration", Chemical Engineering Progress, vol. 49, No. 9, 1953, pp. 467-479.
Tiller, F. M. and Cooper, Harrison, "The Role of Porosity in Filtration: Part V: Porosity Variation in Filter Cakes", A.I. Ch.E. Journal, vol. 8, No. 4, 1962, pp. 445-449.
Tiller, F. M. and Shirato, Mompei, "The Role of Porosity in Filtration: VI New Definition of Filtration Resistance", A.I. Ch.E. Journal, vol. 10, No. 1, 1964, pp. 61-67.
Videnov, N; Shoumkov, S., Dimitrov, Z.; Mogilski, L. and Brakalov, L., "Beneficiation of Diatomites by High Gradient Magnetic Separation", International Journal of Mineral Processing, vol. 39, 1993, pp. 291-298.
Wang, S., "Comprehensive Utilization of Lake Diatomite and Study on its Thermal Flotation Technique," Feijinshukuan, No. 3, 1992 Abstract.
Hessling, Gather, "Evaluating Cost Effective Fine and Ultra-Fine Grinding Systems for Industrial Minerals", 17th Industrial Minerals International Congress, 2004, pp. 148-154.
Product Data Sheet for Petrothene® NA345.
Hixon, L. M., "Select an Effective Size-Reduction System", Chemical Engineering Progress, 1991, pp. 36-44.
Abstract for SU 929164 B, Publication date May 25, 1982—XP-002186842.
Huang, C. C., "Air Classifiers: How They Work and How to Select One", Powder and Bulk Engineering, 1996, pp. 69-81.
Technical Report WG/92/39-Mineralogy and Petrology Series, "Industrial Minerals Laboratory Manual Diatomite", British Geological Survey, 1993.
International Search Report and Written Opinion for PCT Application No. PCT/US2004/031968, dated Dec. 23, 2004.
Supplementary European Search Report in EP Application No. 04789247.6, dated Feb. 27, 2008.
3 Chemical Abstracts 105 (1909) (Abstract for FR 377,086).
23 Chemical Abstracts 1729 (1929) (Abstract for DE 469606).
30 Chemical Abstracts 11669 (1956) (Abstract for IT 487158).
33 Chemical Abstracts 9084 (1939) (Abstract for E.C.C. Baly, W.P. Pepper, & C.E. Vernon, "THH Adsorption of the Hydrous Metallic Oxides by Kieselguhr," 35 Trans. Faraday Soc. 1165-1175 (1939)).
52 Chemical Abstracts 15007 (1958) (Abstract for IT 529036).
53 Chemical Abstracts 15427 (1959) (Abstract for JP S33-4414).
55 Chemical Abstracts 2954 (1961) (Abstract for DE 1 052 964).
75 Chemical Abstracts 143572x (1971) (Abstract for JP S46-7563).
116 Chemical Abstracts 108933j (1992) (Abstract for CN 1053564 A).
116 Chemical Abstracts 86932d (1992) (Abstract for CN 1044233 A).
120 Chemical Abstracts 110820w (1994) (Abstract for Huaizhi Cai, Shixong Bao, & Chongguang Wang, "Experimental Research on Purification of Sichuan Miyi Diatomite," 6 Kuangchan Zonghe Liyong 1-8 (1992)).
Abstract for Y.B. Bhirud & S .S. Shetty, "Role of Classification in Powder Coating Paint Production," 34(1) Chem. Eng'g World 61-62 (1999) (XP-002468935).
Office Action dated Aug. 30, 2011 in related EP Application No. 04789247.6.
Office Action dated Jun. 28, 2010 in related EP Application No. 04789247.6.
Office Action dated Jun. 12, 2009 in related EP Application No. 04789247.6.
Office Action dated Sep. 8, 2008 in related EP Application No. 04789247.6.
Office Action dated Nov. 22, 2011 in related U.S. Appl. No. 11/575,608, filed Jan. 11, 2008.
Office Action dated May 24, 2011 in related U.S. Appl. No. 11/575,608, filed Jan. 11, 2008.
Office Action dated Dec. 10, 2010, in related U.S. Appl. No. 11/575,608, filed Jan. 11, 2008.
Office Action dated May 11, 2010 in related U.S. Appl. No. 11/575,608, filed Jan. 11, 2008.
Office Action dated Sep. 30, 2009 in related U.S. Appl. No. 11/575,608, filed Jan. 11, 2008.

\* cited by examiner

An SEM Image of AF Silica 1974 Fines Under 6000x Magnification

An SEM Image of AF Silica 1974 Fines Under 3000x Magnification

An SEM Image of AF Silica 1974 Under 1200x Magnification

An SEM Image of AF Silica 1974 Under 900x Magnification

An SEM Image of AF Silica 1974 Under 200x Magnification

NATURAL AMORPHOUS SILICA FILLER PRODUCTS

CLAIM OF PRIORITY/INCORPORATION BY REFERENCE

This application is a U.S. national stage entry under 35 U.S.C. §371 from PCT International Application No. PCT/US2010/026627, filed Mar. 9, 2010, and claims priority to and the benefit of the filing dates of U.S. Provisional Application No. 61/159,208, filed Mar. 11, 2009, and U.S. Provisional Application No. 61/169,186, filed Apr. 14, 2009, the subject matter of all of which is incorporated herein by reference.

FIELD OF THE INVENTION

This application and the inventions described herein generally discuss and relate to natural amorphous silica filler products.

BACKGROUND OF THE INVENTION

For many years, silica-based fillers have been used in a variety of products to improve properties including, but not limited to, color properties, anti-blocking properties, and tensile properties in, for instance, polymer and coating applications. Certain qualities that enhance a filler's performance—such as, for example, fine particle size, high brightness, low oil absorption—are desirable in many commercial applications, and fillers possessing those characteristics generally have much higher commercial value than those that do not.

Silica is available in both crystalline and amorphous forms, and can be of natural origin or synthetically produced. Crystalline silica has been reported in some cases to have potentially harmful health effects, and so has become disfavored in many end uses. Synthetic silica is generally more expensive than natural silica.

Accordingly, there is a need for a natural amorphous silica filler product with one or more beneficial characteristics including, but not limited to, fine particle size, low oil absorption, and high brightness, but lacking the high crystalline silica content and high cost associated with many synthetic mineral fillers, which may be used in at least one of a variety of filler applications. The commercial values of such products, because of their unique characteristics, would be expected to be much higher than for conventional diatomite and perlite filter products currently on the market.

SUMMARY OF THE INVENTION

Figure 1:
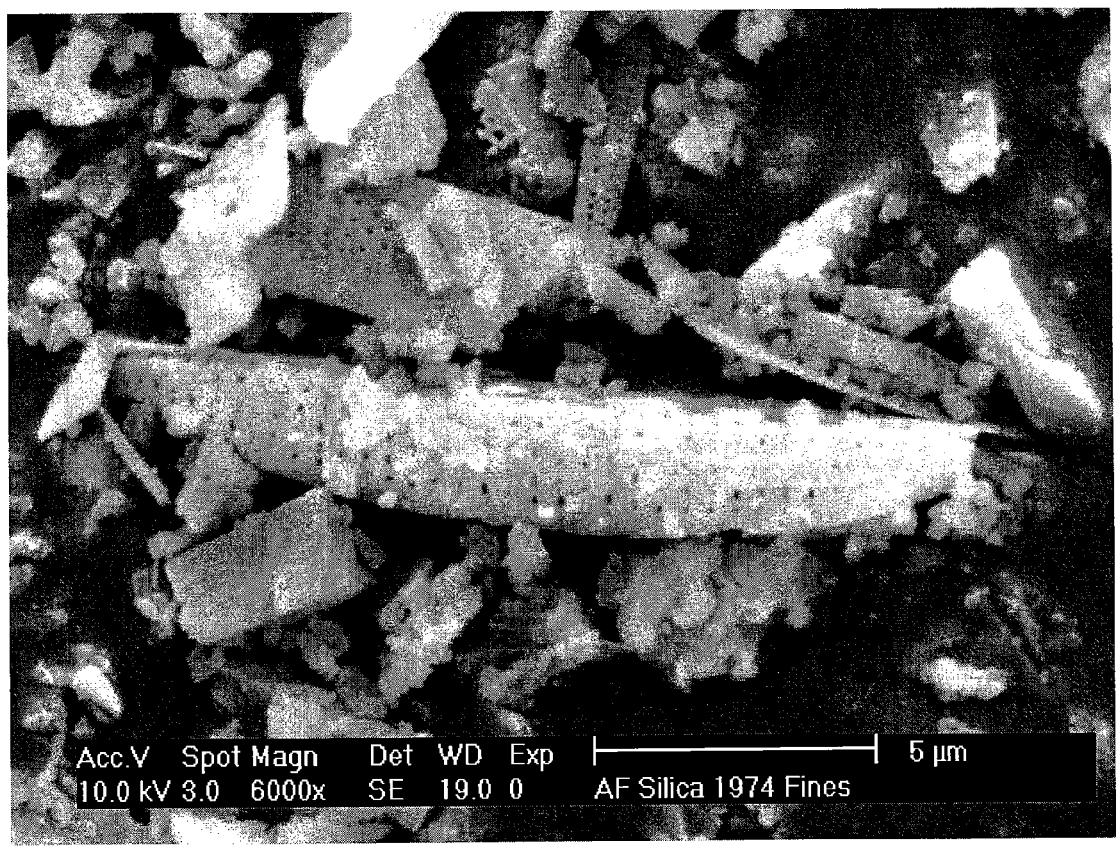
FIG. 1 is a scanning electron microscope image of AF Silica 1974 fines under 6000× magnification.
Figure 2:
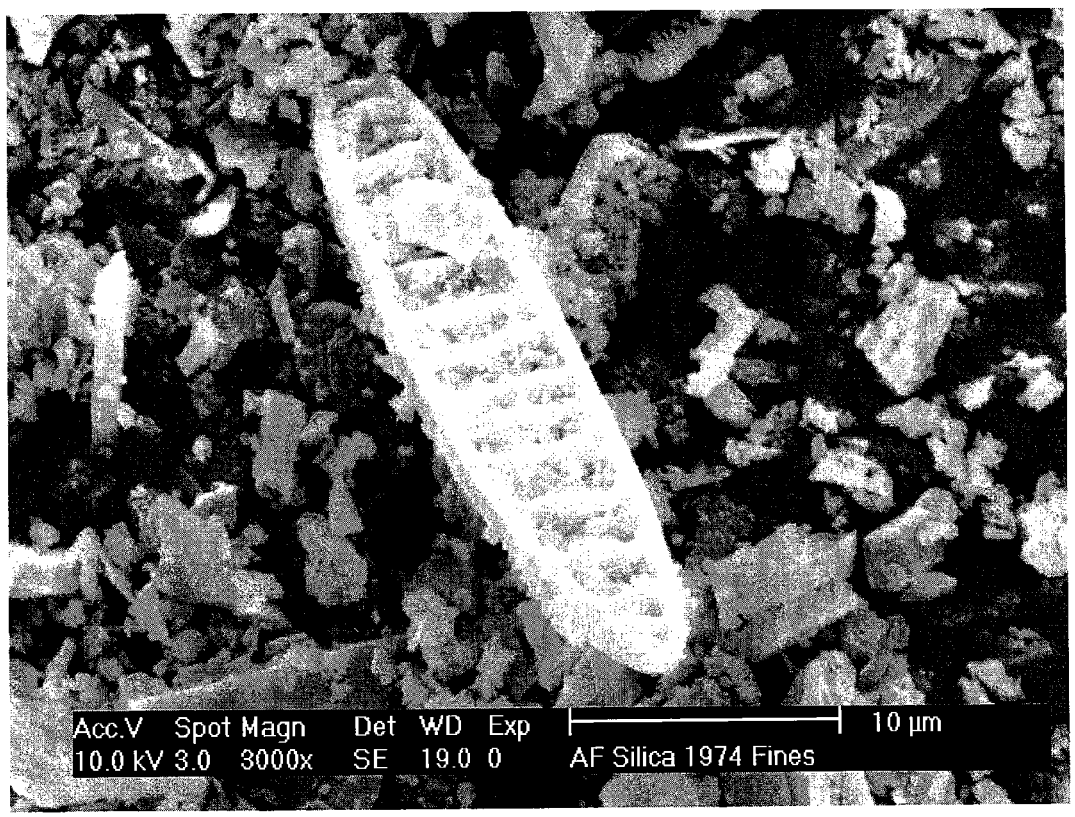
FIG. 2 is a scanning electron microscope image of AF Silica 1974 fines under 3000× magnification.
Figure 3:
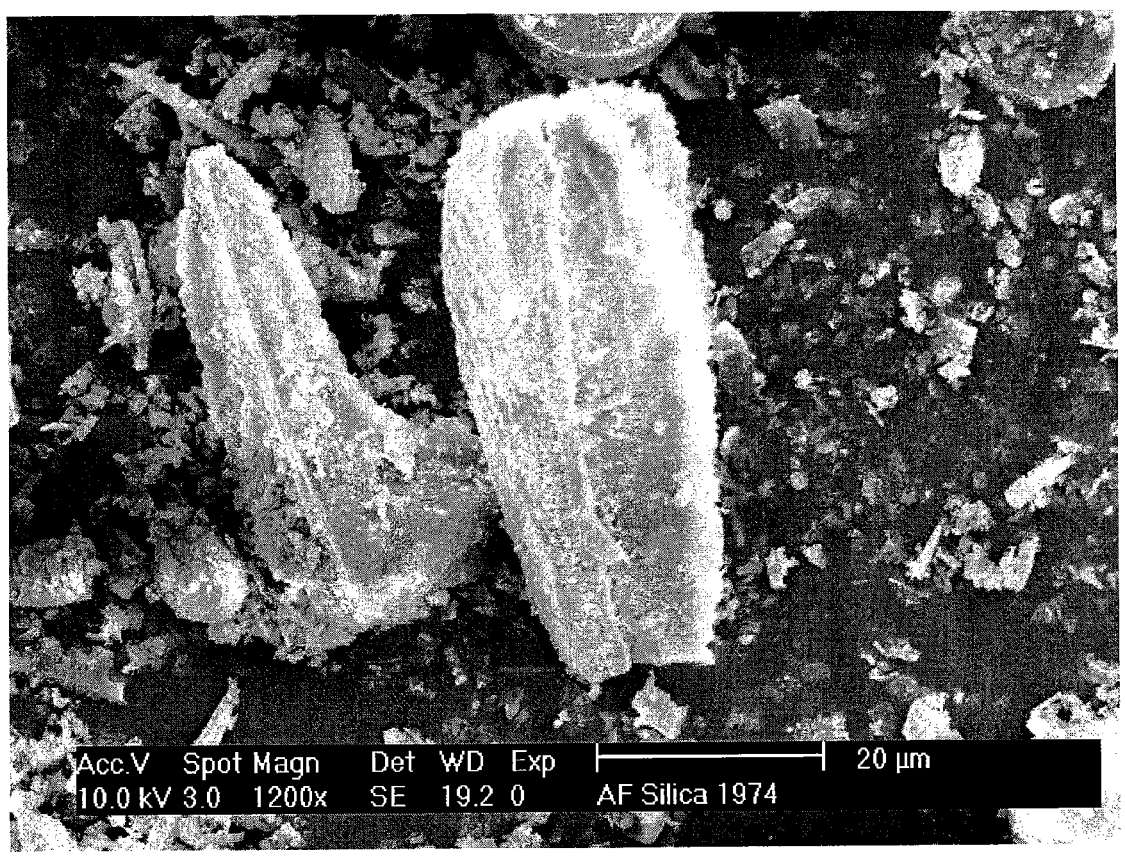
FIG. 3 is a scanning electron microscope image of AF Silica 1974 under 1200× magnification.
Figure 4:
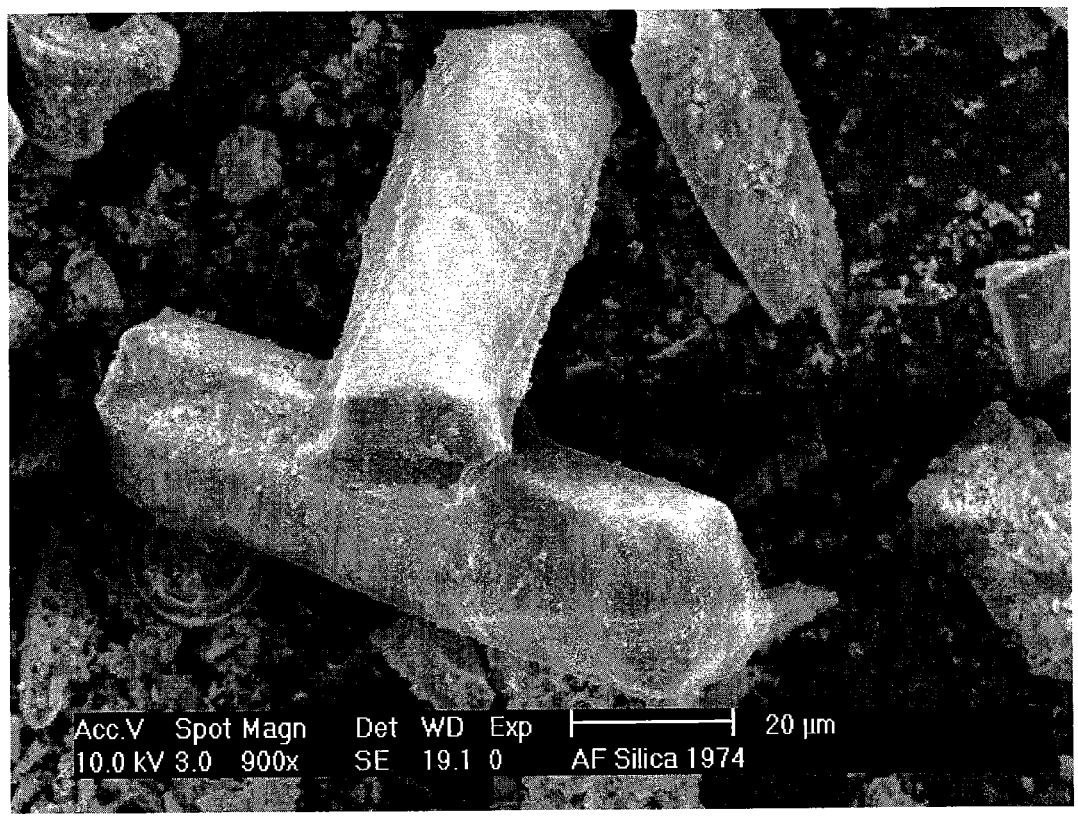
FIG. 4 is a scanning electron microscope image of AF Silica 1974 under 900× magnification.

This application and the inventions described herein generally relate to natural amorphous silica filler products that may comprise at least one of, inter alia, high brightness, low oil absorption, fine particle size, and low crystalline silica content. In one embodiment, the disclosed mineral filler products are derived or made from at least one natural amorphous silica feed material, which is silica. Also disclosed generally herein are methods for producing natural amorphous silica filler products, which may additionally undergo at least one surface treatment to enhance or to further enhance the filler's performance. Methods for using the natural amorphous silica products are also disclosed. The natural amorphous silica filler products of the present inventions can be useful in a range of products including, but not limited to, polymers, sealants, paints, caulks, latex, architectural coatings, industrial coatings, pozzolan, glass catalysts, ceramic glazes, and anti-blocking applications.

DETAILED DESCRIPTION OF THE INVENTION

Mineral Feed Material

The natural amorphous silica filler products disclosed herein are made from at least one natural amorphous silica feed material. Combinations of one or more natural amorphous silica feed materials may be used. The skilled artisan will readily understand appropriate natural amorphous silica feed materials may include, for example, diatomaceous earth and diatomaceous earth derivatives, rice hull ash, and naturally occurring mineral silica, such for example can be found in some hydrothermally altered rhyolitic deposits.

In one embodiment, the at least one natural amorphous silica feed material is diatomaceous earth or a diatomaceous earth derived material. Diatomaceous earth is, in general, a sedimentary biogenic silica deposit comprising the fossilized skeletons of diatoms, one-celled algae-like plants that accumulate in marine or fresh water environments. Porous silica structures generally give diatomaceous earth one or more useful characteristics, such as absorptive capacity, high surface area, chemical stability, and low bulk density.

Preparation of Natural Amorphous Silica Filler Products

The natural amorphous silica filler products disclosed herein may be prepared by subjecting at least one natural amorphous silica feed material to at least one classification. One of ordinary skill in the art will recognize that other conventional processing techniques, for example screening and/or comminution, may be used as appropriate to prepare the at least one natural amorphous silica feed material. In one embodiment of a method of preparing the natural amorphous silica mineral filler products, at least one crude ore of natural amorphous silica is crushed to a size that can be further reduced by milling, then air classified, and then dried in a furnace in air, followed by air classification, to achieve a filler product with desired particle size distribution. In another embodiment, drying may occur before and/or after an air classification.

Any classification method now known to one of ordinary skill in the art or discovered hereafter may be used. In one embodiment, at least one air classification is used. In another embodiment, the natural amorphous silica filler product is produced using a commercially available air classifier equipped with at least one high speed classifier wheel. Without wishing to be bound by any particular air classification configuration, air classifiers generally comprise at least one horizontally or vertically mounted high speed classifying wheel and at least one classifying air outlet. The classifying air injected into the machine base flows inwards through the classifying wheel and discharges the fine material, whereas the coarse particles rejected by the classifying wheel leave the classifier through the coarse material outlet. Several parameters, such as for example classifier wheel speed and air flow, may be optimized to achieve desired products. In one embodiment, the fine fraction collected in the cyclone is a natural amorphous silica filler product and coarse fraction collected in the separator is a by-product or waste when coarse particles are removed. In another embodiment, the coarse fraction collected in the separator is a natural amorphous silica filler product and fine fraction collected in the cyclone is a by-product when ultra fine particles are removed. Subjecting the at least one natural amorphous silica feed material to two or more classifications may, for example, result in products with narrow particles size distribution for better performance.

In one embodiment, a Alpine™ 200 ATP air classifier (Hosokawa Micron Powder Systems, Summit, N.J.) is used to classify the at least one natural amorphous silica feed material. Examples of parameters for the Alpine™ 200 ATP classifier include, but are not limited to, classifier wheel speed from about 5000 rpm to about 8000 rpm and total air flow pressure from about 100 to about 400 SCFM (Standard Cubic Feet per Minute).

In another embodiment, a Micro-Sizer MS-5 air classifier (Progressive Industries, Sylacauga, Ala.) is used to classify the at least one natural amorphous silica feed material. Examples of parameters for the Micro-Sizer MS-5 classifier include, but are not limited to, classifier wheel speed from about 500 rpm to about 4000 rpm and air fan speed from about 3000 rpm to about 5000 rpm.

In a further embodiment, a simple laboratory scale air classifier is used to classify the at least one natural amorphous silica feed material. In one embodiment, such a classifier may be used advantageously to make small quantities of product. In another embodiment, the fan speed for a laboratory scale classifier is from about 1000 rpm to about 3570 rpm.

In another embodiment, the at least one natural amorphous silica is prepared by subjecting the at least one natural amorphous silica feed material to at least one classification chosen form sieving of the feed materials through at least one screen. In one such embodiment, the feed material is sieved through two or more screens having progressively smaller mesh sizes.

Other possible classification methods of preparing the product of the present invention also include, but are not limited to: milling through a fixed gap mill, such as a roller mill; wet classification techniques such as sedimentation, which separates suspended solid particles from a liquid by gravity settling; and hydrocycloning, which uses centrifugal action to classify particles in a liquid media.

After the at least one classification, the natural amorphous silica filler product may be subjected to at least one optional surface treatment.

In one embodiment, the at least one optional surface treatment comprises treating the natural amorphous silica filler product with at least one chemical coupling agent. One non-limiting example of an at least one chemical coupling agent is a silane. In one embodiment the at least one surface treatment silanizes the natural amorphous silica filler, wherein the at least one surface treating agent is at least one siloxane. In general, siloxanes are any of a class of organic or inorganic chemical compounds comprising silicon, oxygen, and often carbon and hydrogen, based on the general empirical formula of $R_2SiO$, where R may be an alkyl group. Exemplary siloxanes include, but are not limited to, dimethylsiloxane, methylphenylsiloxane, methylhydrogen siloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In one embodiment, the at least one surface treatment silanizes the natural amorphous silica filler, wherein the at least one surface treating agent is at least one silane. In general, silanes and other monomeric silicon compounds have the ability to bond inorganic materials, such as the natural amorphous silica filler, to organic resins and materials, such as at least one active ingredient. The bonding mechanism may be due largely to two groups in the silane structure: the $Si(OR_3)$ portion interacts with the natural amorphous silica filler, while the organofunctional (vinyl-, amino-, epoxy-, etc.) group interact with the at least one active ingredient.

In one embodiment, the natural amorphous silica filler product is subjected to at least one surface treatment with at least one ionic silane. Exemplary ionic silanes include, but are not limited to, 3-(trimethoxysilyl)propyl-ethylenediamine triacetic acid trisodium salt and 3-(trihydroxysilyl)propylmethylphosphonate salt. In another embodiment, the natural amorphous silica filler product is subjected to at least one surface treatment with at least one nonionic silane. In a further embodiment, the natural amorphous silica filler product is subjected to at least one surface treatment with at least one silane of Formula (I):

$$(R^1)_xSi(R^2)_{3-x}R^3 \qquad (I)$$

wherein: $R^1$ is any hydrolysable moiety that may chemically react with any active group on the surface of the natural amorphous silica filler, such as but not limited to alkoxy, halogen, hydroxy, aryloxy, amino, amide, methacrylate, mercapto, carbonyl, urethane, pyrrole, carboxy, cyano, aminoacyl, or acylamino, alkyl ester, and aryl ester; X has a value between 1 and 3, such that more than one siloxane bond may be formed between the natural amorphous silica filler and the at least one silane; $R^2$ is any carbon-bearing moiety that does not substantially react or interact with the natural amorphous silica filler during the treatment process, such as but not limited to substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl; $R^3$ is any organic containing moiety that remains substantially chemically attached to the silicon atom of Formula (I) once the at least one surface treatment is completed and that is capable or reacting or interacting with the at least one active ingredient, such as but not limited to hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalky, cycloalkenyl, heteroaryl, and heterocyclic is optionally substituted by, for example, halogen, hydroxy, amino, carboxy, or cyano.

In another embodiment, the natural amorphous silica filler has a hydroxyl-bearing porous surface which is subjected to at least one surface treatment with at least one silane, such that the material surface is covalently bonded to the at least one silane. In such an embodiment, the surface area of the natural amorphous silica filler may limit the amount of the bound silane and, as a result, it may be preferable to subject the carrier material to at least one physical surface treatment that increases the surface area of the carrier material prior to treatment with the at least one silane.

In a further embodiment, the natural amorphous silica filler is subjected to at least one surface treatment with at least one silane having one or more moieties selected from the group consisting of alkoxy, quaternary ammonium, aryl, epoxy, amino, urea, methacrylate, imidazole, carboxy, carbonyl, isocyano, isothiorium, ether, phosphonate, sulfonate, urethane, ureido, sulfhydryl, carboxylate, amide, pyrrole, and ionic.

Exemplary silanes having an alkoxy moiety include, but are not limited to, are mono-, di-, or trialkoxysilanes, such as n-octadecyltriethoxysilane, n-octyltriethoxysilane, and phenyltriethoxysilane.

Exemplary silanes having a quaternary ammonium moiety include, but are not limited to, quaternary ammonium salts of a substituted silanes, 3-(trimethoxysilyl) propyloctadecyldimethylammonium chloride, poly-(diallyldimethylammonium chloride), N-trimethoxysilylpropyl-N,N,N-trimethylammonium chloride, octadecylaminodimethyl trimethoxysilylpropyl ammonium chloride, and 3-(N-styrylmethyl-2-aminoethylamino)-propyltrimethoxysilane hydrochloride.

Exemplary silanes having an aryl moiety include, but are not limited to, 3-(trimethoxysilyl)-2-(p,m-chloromethyl)-phenylethane, 2-hydroxy-4-(3-triethoxysilylpropoxy)-diphenylketone, ((chloromethyl)phenylethyl)trimethoxysilane and phenyldimethylethoxysilane.

Exemplary silanes having an epoxy moiety include, but are not limited to, 3-g lycidoxypropyltrimethoxysilane and 2-(3,4-epoxycyclohexyl) ethyltrimethoxysilane.

Exemplary silanes having an amino moiety include, but are not limited to, 3-aminopropyltrimethoxysilane, N-(2-aminoethyl)-3-aminopropyltrimethoxysilane, trimethoxysilylpropyldiethylenetriamine, 2-(trimethoxysilylethyl) pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-amino propyltriethoxysilane.

Exemplary silanes having a urea moiety include, but are not limited to, N-(triethoxysilylpropyl)urea and N-1-phenylethyl-N'-triethoxysilylpropylurea.

A nonlimiting example of a silane having a methacrylate moiety is 3-(trimethoxysilyl)propyl methacrylate.

Exemplary silanes having an imidazole moiety include, but are not limited to, N-[3-(triethoxysilyl)propyl]imidazole and N-(3-triethoxysilylpropyl)-4,5-dihydroimidazole.

A nonlimiting example of a silane having a carbonyl moiety is 3-(triethoxysilyl)propylsuccinate.

Exemplary silanes with an isocyano moiety include, but are not limited to, tris(3-trimethoxysilylpropyl)isocyanurate and 3-isocyanatopropyltriethoxysilane.

A nonlimiting example of a silane having an isothiourium moiety is the salt of trimethoxysilylpropylisothiouronium, such as the chloride salt.

Exemplary silanes having an ether moiety include, but are not limited to, bis[(3-methyldimethoxysilyl)propyl]-polypropylene oxide and N-(triethoxysilylpropyl)-O-polyethylene oxide urethane.

A nonlimiting example of a silane having a sulfonate moiety is 2-(4-chlorosulfonylphenyl)-ethyltrichlorosilane.

Exemplary silanes having a urethane moiety include, but are not limited to, N-(triethoxysilylpropyl)-O-polyethylene oxide urethane and O-(propargyloxy)-N-(triethoxysilylpropyl) urethane.

A nonlimiting example of a silane having a sulfhydryl moiety is 3-mercaptopropyltriethoxysilane.

Exemplary silanes having an amide moiety include, but are not limited to, triethoxysilylpropylethyl-carbamate, N-(3-triethoxysilylpropyl)-gluconamide, N-(triethoxysilylpropyl)-4-hydroxybutyramide.

In yet another embodiment, the natural amorphous silica filler is subjected to surface treatment with a combination of silanes, such as but not limited to: N-trimethoxysilylpropyl-N, N,N-trimethylammonium chloride and bis(2-hydroxyethyl)-3-aminopropyltriethoxysilane; 3-aminopropyltrimethoxysilane and N-(triethoxysilylpropyl)-O-polyethylene oxide urethane; 3-trihydrosilylpropyhnethylphosphonate, sodium salt, and N-(triethoxysilylpropyl)-O-polyethylene oxide urethane; N-trimethoxysilylpropyl-N,N,N—Cl, trimethylammonium chloride and (3-glycidoxypropyl)trimethoxysilane; 3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene urethane; 2-(trimethoxysilylethyl) pyridine and N-(3-triethoxysilylpropyl)-gluconamide; trimethoxysilylpropyl-N, N,N—Cl, trimethylammonium chloride and N-(3-triethoxysilylpropyl)-gluconamide; N-trimethoxysilylpropyl-N, N,N—Cl, trimethylammonium chloride and 2-hydroxy-4-(3-triethoxysilylpropoxy)-diphenylketone; mercaptopropyltriethoxysilane and N-(triethoxysilylpropyl)-O-polyethylene oxide urethane; 3-(triethoxysilyl)propylsuccinic and N-(triethoxysilylpropyl)-O-polyethylene urethane, trimethoxysilylpropyl-ethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and bis-(2-hydroxyethyl)-3-aminopropyltriethoxysilane.

In some embodiments, silanization may proceed according to "wet" or "dry" processes well-known to the skilled artisan. For example, a "wet" process generally comprises reacting the at least one silane onto the natural amorphous silica filler in at least one solvent (e.g., organic solvent or water). In one embodiment, heat is used in place of or in addition to the at least one solvent. Heat or solvent is not required for the "wet" process, but it may improve the reaction rate and the uniform surface coverage. In another embodiment, a "wet" process includes in-line mixing of slurries or liquids during typical silanization processing steps, including but not limited to filtration and drying.

In one embodiment, a "dry" process generally comprises reacting the at least one silane with the natural amorphous silica filler in a vapor phase by mixing the at least one silane with the natural amorphous silica filler and then heating the mixture. In another embodiment, a "dry" process comprises reacting the at least one silane with the natural amorphous silica filler in a stirred liquid phase by mixing the at least one silane with the natural amorphous silica filler and then heating the mixture. In one embodiment, a "dry" process comprises mixing at least one silane with the natural amorphous silica filler and incubating in a sealed container at elevated temperatures to speed up the surface treatment process. In yet another embodiment, the "dry" process includes mixing of dry powdered natural amorphous silica filler and a liquid silane additive, where the amount of silane added is small enough that the reaction mass remains solid-like and can continue to be processed like a dry powder.

In one embodiment, the natural amorphous silica filler is subjected to at least one surface treatment with at least one silane by adding the at least one silane gradually to a rapidly stirred solvent, which is in direct contact with the natural amorphous silica filler. In another embodiment, the natural amorphous silica filler is subject to at least one surface treatment with at least one silane by carrying out the treatment in a vapor phase, which causes the vapor of the at least one silane to contact and react with the natural amorphous silica filler.

In another embodiment, the natural amorphous silica filler is placed in a vacuum reactor and dried under vacuum. At least one silane may then be added to the vacuum chamber as a vapor and contact the natural amorphous silica filler. After a certain contact time, byproducts of the reaction may be removed under reduced pressure. When the vacuum is released, the surface treated carrier material may be removed from the chamber. The actual treatment process may be carried out in a period from about 1 minute to about 24 hours. The treatments can be carried out at temperatures ranging from about 0° C. to about 400° C.

The amount of at least one silane used in the at least one surface treatment may depend on various factors, including but not limited to the amount of the at least one carrier material to be surface treated, the number of hydroxyl groups on the surface of the at least one carrier material to be reacted, and the molecular weight of the at least one silane. In one embodiment, a stoichiometric amount equivalent to the available surface hydroxyls plus some excess amount of the at least one silane is used for the at least one surface treatment, in an effort to reduce the number of potential side reactions. In another embodiment, greater than a stoichiometric amount of at least one silane is used to create a thicker or more dense surface treatment. In one embodiment, about 0 to about 500 times stoichiometric excess is used. In another embodiment, about 5 to about 100 times stoichiometric excess is used. In a further embodiment, about 10 to about 50 times stoichiometric excess is used. In yet another embodiment, about 10 to about 20 times stoichiometric excess is used.

In some embodiments, at least one silane with at least one hydrolysable group may condense with at least one hydroxyl group on the surface of the natural amorphous silica filler and provide covalent coupling of organic groups to those substrates. In one embodiment, at least one alkoxy group of the at least one silane chemically reacts with at least one hydroxyl group on the surface of the natural amorphous silica filler. In another embodiment, at least one silane having at least one quaternary ammonium moiety is used and the protonated, positive charge of those silanes electrostatically attract to at least one deprotonated group of the natural amorphous silica filler to facilitate fast and efficient reaction.

In another embodiment, the natural amorphous silica filler has a plurality of acidic surface sites. In one embodiment, these acidic surface sites can be at least partially neutralized by at least one basic organic compound. The skilled artisan will be readily aware of basic organic compounds presently known or hereafter discovered that would be appropriate for use in compositions and methods disclosed herein. As used herein, an organic compound is a compound comprising a molecular backbone or structure generally comprised of carbon molecules. In one embodiment, the at least one basic organic compound is any basic organic compound that neutralizes, i.e., makes less acidic, at least one surface acidic site in the natural amorphous silica filler. In another embodiment, the at least one basic organic compound is any molecule that at least partially sterically blocks at least one surface acidic site of the natural amorphous silica filler and/or the at least one impurity, effectively rendering the site and/or the natural amorphous silica filler. In a further embodiment, the at least one basic organic compound is chosen from basic organic compounds with a pKa of greater than about 7. In yet another embodiment, the at least one basic organic compound is chosen from amino acids with a pKa of greater than about 7. In yet a further embodiment, the at least one basic organic compound is chosen from organic compounds comprising at least one basic group chosen from the group consisting of amines, imines, and ammonia. In still another embodiment, the at least one basic organic compound comprises at least one amine group. In still a further embodiment, the at least one amine is chosen from amino ethers, alkanolamines, aminosilanes, ethyleneamines, and aminoesters. In another embodiment, the at least one imine is chosen from ethyleneimines and polyethyleneimines.

One or more acidic surface sites may be at least partially neutralized by one or more basic organic compounds. In one embodiment, at least a first acidic surface site is at least partially neutralized by at least a first basic organic compound and at least a second acidic surface site is at least partially neutralized by at least a second basic organic compound. In another embodiment, at least one acidic surface site is at partially neutralized by at least a first basic organic compound and at least a second basic organic compound. In a further embodiment, at least one acidic surface site associated with the natural amorphous silica filler is at least partially neutralized by a different at least one basic organic compound than the at least a second acidic surface site associated with an at least one impurity.

In one embodiment, the at least one basic organic compound comprises at least one amine. In one embodiment, the at least one basic compound is chosen from the group consisting of primary, secondary, and tertiary (poly)amines. In another embodiment, the at least one basic compound is methylamine. In a further embodiment, the at least one basic compound is ethylamine. In yet another embodiment, the at least one basic compound is diethylamine. In yet a further embodiment, the at least one basic compound is 1,3-propanediamine.

In another embodiment, the at least one basic organic compound comprises at least one amino ether. In one embodiment, the at least one basic compound is chosen from the group consisting of polyether amines and morpholines. One non-limiting example of a polyether amine is the long chain polyether amine sold by Huntsman Company under the tradename Jeffamines®.

In a further embodiment, the at least one basic organic compound comprises at least one alkanolamine. In one embodiment, the at least one basic compound is chosen from the group consisting of 2-amino-2-methyl-1-propanol (2-AMP), monoethanolamine, diethanolamine, triethanolamine (TEA), monoisopropanolamine, triisopropanolamine, diethylaminoethanol (DEAE), methylethanolamine, dimethylethanolamine, ethylaminoethanol, amino-methypropanol, and alkanolamine aminomethylpropanol (AMP). In another embodiment, the at least one basic compound is alkanolamine aminomethylpropanol (AMP).

In yet another embodiment, the at least one basic organic compound comprises at least one aminosilane. In one embodiment, the at least one basic compound is chosen from the group consisting of 3-aminopropyltrimethoxysilane, N-(2-aminoethyl)-3-aminopropyltrimethoxysilane, trimethoxysilylpropyldiethylenetriamine, 2-(trimethoxysilylethyl)pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-amino propyltriethoxysilane.

In yet a further embodiment, the at least one basic organic compound comprises at least one ethyleneamine. In one embodiment, the at least one basic compound is chosen from the group consisting of ethylenediamine, diethylenetriamine, piperazine, N-aminoethylpiperazine, triethylenetetramine, tetraethylenepentamine, pentaethylenehexamine, and higher ethylenepolyamines. Exemplary, non-limiting higher ethylenepolyamines are those sold under the name HEPA delamines by Azko Nobel Chemicals. In one embodiment, the higher ethylenepolyamines also act as dispersants.

In still another embodiment, at least one basic organic compound comprises at least one aminoester. In one embodiment, the at least one basic organic compound is chosen from organic compounds comprising ester-substituents chosen from primary, secondary, and tertiary amines of acrylic and methacrylic acids. In another embodiment, the at least one basic organic compound is chosen from N-substituted acrylamides, wherein the alkyl group comprises from 2 to 12 carbon atoms, including but not limited to N-ethylacrylamide, N-tert-butylacrylamide, N-tert-octylacrylamide, N-octylacrylamide, N-decylacrylamide, and N-dodecylacrylamide. In a further embodiment, the at least one basic organic compound is chosen from N-substituted methacrylamides, wherein the alkyl group comprises from 2 to 12 carbon atoms, including but not limited to N-ethylmethacrylamide, N-tert-butylmethacrylamide, N-tert-octylmethacrylamide, N-octylmethacrylamide, N-decylmethacrylamide, and N-dodecylmethacrylamide. In yet another embodiment, the at least one basic organic compound is chosen from the group consisting of aminoethyl, butylaminoethyl, N,N'-dimethylaminoethyl, and N-tert-butylaminoethyl methacrylates.

The at least one treatment of the natural amorphous silica filler with the at least one basic organic compound is any treatment now known to the skilled artisan or hereafter discovered that, in one embodiment, allows the at least one basic organic compound to neutralize at least one surface acidic site of the natural amorphous silica filler. In another embodiment, the at least one treatment is any treatment that allows the at least one basic organic compound to at least partially sterically block at least one surface acidic site of the natural amorphous silica filler. In a further embodiment, the at least one treatment comprises mixing the natural amorphous silica filler with the at least one basic organic compound. In yet another embodiment, the at least one treatment comprises spraying, misting, mixing, coating in a fluidized bed or paddle mixer, or treatment in a steam mill. In yet a further embodiment, the at least one treatment comprises slurrying the natural amorphous silica filler in water and mixing the resulting natural amorphous silica filler slurry with the at least one basic organic compound.

The at least one treatment may comprise exposing the natural amorphous silica filler to the at least one basic organic compound in the presence of at least one ionizing medium. The at least one ionizing medium may be any medium that allows the natural amorphous silica filler to be treated with the at least one basic organic compound. In one embodiment, the at least one ionizing medium is at least one aqueous medium. In another embodiment, the at least one ionizing medium is water.

The natural amorphous silica filler may be subjected to at least one treatment with any appropriate amount of the at least one basic organic compound to effect the desired level of neutralization and/or effect the desired properties of the organo-neutralized natural amorphous silica filler. In one embodiment, the at least one basic organic compound is added in an amount greater than about 0.25% relative to the total weight of the natural amorphous silica filler. In another embodiment, the at least one basic organic compound is added in an amount greater than about 0.5% relative to the total weight of the natural amorphous silica filler. In a further embodiment, the at least one basic organic compound is added in an amount greater than about 1% relative to the total weight of the natural amorphous silica filler. In yet another embodiment, the basic organic compound is added in an amount greater than about 2% relative to the total weight of the natural amorphous silica filler. In yet a further embodiment, the basic organic compound is added in an amount from about 0.1% to about 5% relative to the total weight of the natural amorphous silica filler. In still another embodiment, the basic organic compound is added in an amount from about 0.5% to about 2% relative to the total weight of the natural amorphous silica filler.

In one embodiment, the organo-neutralized natural amorphous silica filler has a pKa ranging from about 4 to about 7.

In a further embodiment, the optional surface treatment comprises treating the natural amorphous silica filler product with at least one additive to improve color. One non-limiting example of an at least one color-improving additive is ultramarine blue.

Natural Amorphous Silica Filler Product

The natural amorphous silica filler products disclosed herein may possess at least one property including, but not limited to, high brightness, low yellowness, low oil absorption, low alkali content, low $Fe_2O_3$ content, low $Al_2O_3$ content, fine particle size, low crystalline silica content, low porosity, high anti-blocking performance, high matting efficiency, high scrub resistance, and beneficial color characteristics.

The natural amorphous silica filler products may have a high $SiO_2$ content. In one embodiment, the natural amorphous silica filler products comprise at least about 90% $SiO_2$. In another embodiment, the natural amorphous silica filler products comprise at least about 95% $SiO_2$. In a further embodiment, high $SiO_2$ content results in high brightness.

The natural amorphous silica filler products may have a low $Fe_2O_3$ content. In one embodiment, the natural amorphous silica filler products comprise less than 1% $Fe_2O_3$. In another embodiment, the natural amorphous silica filler products comprise less than 0.5% $Fe_2O_3$. In another embodiment, the natural amorphous silica filler products comprise less than 0.4% $Fe_2O_3$. In a further embodiment, low $Fe_2O_3$ content results in low yellowness.

The natural amorphous silica filler products may have a high brightness. In one embodiment, the natural amorphous silica filler products comprise at least about 90 in Hunter L-value. In another embodiment, the natural amorphous silica filler products comprise at least about 92 in Hunter L-value. In another embodiment, the natural amorphous silica filler products comprise at least about 94 in Hunter L-value. In another embodiment, the natural amorphous silica filler products comprise at least about 96 in Hunter L-value.

The natural amorphous silica filler products may have a low yellowness. In one embodiment, the natural amorphous silica filler products comprise less than 5 in Hunter b-value. In another embodiment, the natural amorphous silica filler products comprise less than 4 in Hunter b-value. In another embodiment, the natural amorphous silica filler products comprise less than 3 in Hunter b-value. In another embodiment, the natural amorphous silica filler products comprise less than 2.5 in Hunter b-value.

The natural amorphous silica filler products may have low oil absorption. In one embodiment, the natural amorphous silica filler products have an oil absorption of not greater than about 100%. In another embodiment, oil absorption is not greater than about 85%. In a further embodiment, oil absorption is not greater than about 80%. In yet another embodiment, oil absorption is not greater than about 75%.

The natural amorphous silica filler products may have low alkali content and/or low $Al_2O_3$ content. In one embodiment, the natural amorphous silica filler products comprise less than about 2% $Al_2O_3$. In another embodiment, the natural amorphous silica filler products comprise less than about 1% $Al_2O_3$. In a further embodiment, the natural amorphous silica filler products comprise less than about 5% alkali content. In yet another embodiment, the natural amorphous silica filler products comprise less than about 2% alkali content. In yet a further embodiment, the natural amorphous silica filler products comprise less than about 1% alkali content.

The natural amorphous silica filler products may have a fine particle size. In one embodiment, the median particle diameter of the particles comprising the natural amorphous silica filler product is not greater than about 20 microns. In another embodiment, the median particle diameter is not greater than about 16 microns. In a further embodiment, the median particle diameter is not greater than about 10 microns. In yet another embodiment, the median particle diameter is not greater than about 8 microns. In yet a further embodiment, the median particle diameter is not greater than about 6 microns. In still another embodiment, the median particle diameter is not greater than about 5 microns. In still a further embodiment, the median particle diameter is not greater than about 4 microns.

In a further embodiment, the $d_{90}$ of the high brightness natural amorphous silica filler products is not greater than about 50 microns. In another embodiment, the $d_{90}$ is not greater than about 40 microns. In a further embodiment, the $d_{90}$ is not greater than about 30 microns. In yet another embodiment, the $d_{90}$ is not greater than about 20 microns. In yet a further embodiment, the $d_{90}$ is not greater than about 15 microns.

In a further embodiment, the $d_{97}$ of the high brightness natural amorphous silica filler products is not greater than about 80 microns. In another embodiment, the $d_{97}$ is less than about 70 microns. In a further embodiment, the $d_{97}$ is less than about 60 microns. In yet another embodiment, the $d_{97}$ is less than about 50 microns. In yet a further embodiment, the $d_{97}$ is less than about 40 microns.

The natural amorphous silica filler products may have low crystalline silica content. In one embodiment, the crystalline silica is quartz. In one embodiment, the natural amorphous silica filler products comprise less than about 1% crystalline silica. In another embodiment, the natural amorphous silica filler products comprise less than about 0.5% crystalline silica. In another embodiment, the natural amorphous silica filler products comprise less than about 0.2% crystalline silica. In another embodiment, the natural amorphous silica filler products comprise less than about 0.1% crystalline silica.

The natural amorphous silica filler products may have low porosity. In one embodiment, the average pore volume of the particles comprising the natural amorphous silica filler products is not more than about 3 mL/g. In another embodiment, the average pore volume is less than 2 mL/g. In another embodiment, the average pore volume is less than 1.5 mL/g. In another embodiment, the median pore diameter of the particles comprising the natural amorphous silica filler products is not more than about 3 microns. In another embodiment, the median pore diameter is less than 2 microns. In another embodiment, the median pore diameter is less than 1.5 microns. In a further embodiment, the surface area of the natural amorphous silica filler products is not more than about 8 $m^2$/g. In another embodiment, the surface area is less than 6 $m^2$/g.

The natural amorphous silica filler products may have beneficial color characteristics. In one embodiment, the natural amorphous silica filler products have an L-value of not less than about 90. In another embodiment, the L-value is not less than about 92. In another embodiment, the L-value is not less than about 95. In another embodiment, the L-value is not less than about 96. In a further embodiment, the natural amorphous silica filler products have a b-value of not greater than about 5. In another embodiment, the b-value is not greater than about 4. In another embodiment, the b-value is not greater than about 3. In yet another embodiment, the natural amorphous silica filler products have an a-value of not greater than about 0.5. In another embodiment, the a-value is not greater than about 0.4. In a further embodiment, the a-value is not greater than about 0.3.

Measuring Crystalline Silica Content

Crystalline silica content may be measured by any appropriate measurement technique now known to the skilled artisan or hereafter discovered. In one embodiment, crystalline silica content is measured according to the cristobalite content of a sample. In another embodiment, crystalline silica content is measured according to the quartz content of a sample. In a further embodiment, crystalline silica content is measured according to the cristobalite and quartz content in a sample.

In one embodiment, cristobalite content is measured by x-ray diffraction. In another embodiment, cristobalite content is measured by the quantitative X-ray diffraction method outlined in H. P. Klug et al., X-Ray Diffraction Procedures for Polycrystalline and Amorphous Materials 531-563 (2d ed. 1972). In one example of the Klug method, a sample is milled in a mortar and pestle to a fine powder, then back-loaded into a sample holder. The sample and its holder are placed into the beam path of an X-ray diffraction system (e.g., a Philips powder X-ray diffractometer) and exposed to collimated X-rays using an accelerating voltage of about 40 kV and a current of about 20 mA focused on a copper target. Diffraction data are then acquired by step-scanning over the angular region representing the interplanar spacing within the crystalline lattice structure of cristobalite, yielding the greatest diffracted intensity; that region ranges from about 21 to about 23 2θ (2-theta), with data collected in about 0.05 2θ steps, counted for about 20 seconds per step. Finally, the net integrated peak intensity is compared with those of standards of cristobalite prepared by the standard additions method in amorphous silica to determine the weight percent of the cristobalite phase in a sample.

In another embodiment, quartz content is measured by the same x-ray diffraction method described above for cristobalite content, except that the 2θ region ranges from about 26.0 to about 27.5 2θ.

Measuring Particle Size Distribution

Particle size may, in general, have a strong effect on filler performance. For reinforcement in polymers, for instance, classic theory suggests that smaller particle sizes give the best impact strength, because larger particles may provide crack nucleation points within the polymer matrix. The anti-block performance and the film physical properties may also strongly depend on the particle size of filler products. In one embodiment, a more narrow particle size distribution increases the anti-block performance and the matting efficiency of a natural amorphous silica filler product. In such an embodiment, a narrow particle size distribution is desirable because the presence of oversize particles would undesirably roughen the polymer film and/or paint/coating, and because ultra fine particles have little to no beneficial impact on the anti-block and matting.

Particle size distribution may be measured by any appropriate measurement technique now known to the skilled artisan or hereafter discovered. In one embodiment, the method for determining particle size distribution employs laser diffraction. In one such embodiment, the instrument used is a Leeds & Northrup Microtrac Model X-100. The instrument is fully automated, and the results are obtained using a volume distribution formatted in geometric progression of 100 channels, generally running for 30 seconds with the filter on. The distribution is characterized using an algorithm to interpret data from the diffraction pattern which assumes the particles have spherical shape characterized by a diameter, d. A median particle diameter is identified by the instrument as $d_{50}$, that is, 50% of the total particle volume is accounted for by particles having a diameter equal to or less than this value. Likewise, a $d_{90}$ measurement indicates that 90% of the total particle volume is accounted for by particles having a diameter equal to or less than this value. A $d_{97}$ measurement indicates that 97% of the total particle volume is accounted for by particles having a diameter equal to or less than this value.

Measuring Anti-Block Performance

Anti-block products may be used, for example, in plastic films to lessen the adhesion or blocking of the plastic film surface. Anti-block effects may be achieved, for example, by slightly roughening the film surface through surface treatment with wax and/or polymers, or by adding at least one anti-block filler product to the plastic film. Commercial anti-block filler products include, but are not limited to, synthetic silica, flux-calcined diatomaceous earth, and other mineral products such as talc, calcium carbonate, and nepheline syenite. Those additives are intended to produce microscopic roughness on the surface of the film to minimize the flat contact between adjacent layers, i.e., to prevent individual layers from sticking to one another or blocking. Flux calcined diatomaceous earth, is generally one of the most effective anti-block agents and can have very good optical and color characteristics. However, flux-calcined diatomaceous earth also generally has undesirably high levels of crystalline silica. Natural DE has much lower levels of crystalline silica, but has generally not been used in anti-blocking applications due to its relatively poor color characteristics.

Anti-block performance may be measured by any appropriate measurement technique now known to the skilled artisan or hereafter discovered. In one embodiment, anti-block performance is measured in a polyethylene (PE) film containing 2000 ppm of the a given filler sample. In one such embodiment, PE films are extruded into nominal 1.25 mil films, based on Equistar low density polyethylene (LDPE) 345-013 resin, and about 750 ppm of Chemtura Kemamide E Ultra Powder erucamide slip agent is added. Extrusions of the films are performed with a ¾ inch single screw extruder, equipped with a 2.5 inch blown film die, and the films are conditioned for about 24 hours at about 20° C. and about 50% relative humidity. The film samples are then cut, destaticized, and prepared for optical and induced blocking tests based on, for example, ASTM D 3354 (induced blocking) and ASTM D 1003 (haze).

Measuring Color

Color may also be important for fillers in many applications, especially where color of the product in the filler is included is important. Whiter filler products with high blue light brightness may have greater utility, as they can be used in most all colored and white products and, relative to non-white fillers, improved plastic film optical properties. For at least those reasons, mineral filler products with high blue light brightness are often desirable.

Color may be measured by any appropriate measurement technique now known to the skilled artisan or hereafter discovered. In one embodiment, the method for determining the color of the filler products of this application uses Hunter scale L, a, b color data collected on a Spectro/plus Spectrophotometer (Color and Appearance Technology, Inc., Princeton, N.J.). The L value indicates the level of light or dark, the a-value indicates the level of redness or greenness, and the b-value indicates the level of yellowness or blueness. A krypton-filled incandescent lamp is used as the light source. The instrument is calibrated according to the manufacturer's instructions, generally using a highly polished black glass standard and a factory calibrated white opal glass standard. A plastic plate having a depression machined into it is filled with sample, which is then compressed with a smooth-faced plate using a circular pressing motion. The smooth-faced plate is carefully removed to insure an even, unmarred surface. The sample is then placed under the instrument's sample aperture for the measurements.

Measuring Oil Absorption

Low oil absorption may allow lower resin demand in polymer products using the natural amorphous silica filler products disclosed herein. Oil absorption may be measured by any appropriate measurement technique now known to the skilled artisan or hereafter discovered. In one embodiment, the oil absorption of the samples is determined on a weight basis according to ASTM-D1483-95. About 1-10 grams of a sample is placed in an about 100-300 mL ceramic or glass dish. Linseed oil from a 50 ml glass burette is then added to the sample at the rate of about 1 drop per second. During addition of oil, the mixture is stirred using a spatula so that each drop of oil falls on a dry position of the sample. As absorption of oil progresses, the lumps of paste form larger lumps and the oil addition rate should be decreased at this point. The absorption reaches to the end point when the entire dry sample is wet and picked up. The volume of the oil used is then recorded and the oil absorption in weight percentage can thus be calculated:

$$\text{Oil Absorption (wt. \%)} = \frac{\text{Volume Oil Used (mL)} \times \text{Specific Gravity of Oil}}{\text{Weight of Sample (g)}} \times 100$$

Measuring Porosity

Porosity may be measured by any appropriate measurement technique now known to the skilled artisan or hereafter discovered. Examples of porosity measurements may include, but are not limited to, measurements of pore volume, average pore diameter, and surface area. In one embodiment, pore volume is measured with an AutoPore IV 9500 series mercury porosimeter from Micromeritics Instrument Corporation (Norcross, Ga., USA), which can determine measure pore diameters ranging from 0.006 to 600 µm, using a contact angle set at about 130 degrees and a pressure ranging from about 0 psi to about 33000 psi. In one embodiment, surface area is measured according to Brunauer, Emmett, and Teller (BET) theory. BET surface area may be measured by any appropriate measurement technique now known to the skilled artisan or hereafter discovered. In one embodiment, BET surface area is measured with a Gemini III 2375 Surface Area Analyzer, using nitrogen as the sorbent gas.

Measuring Scrub Resistance

Scrub resistance is a measure of the ability of a paint to resist scuffing and marking when rubbed or abraded. A high scrub resistance is generally desirable. Scrub resistance may be measured by any appropriate measurement technique now known to the skilled artisan or hereafter discovered. In one embodiment, scrub resistance is measured according to ASTM D2486-89.

Measuring Total Silica Content

Total silica content is a measure of the relative purity of a natural silica sample. Total silica content may be loosely correlated to color, in that a purer silica is likely to have lower levels of discoloring impurities than a lower purity silica. Total silica content may be measured by any appropriate measurement technique now known to the skilled artisan or hereafter discovered. Highly accurate measurements of total silica content may be determined, for example, by using x-ray fluorescence (XRF) spectrometry, which may also be useful to determine the total content of other elements, such as aluminum, iron, and sodium.

In one embodiment, XRF analysis of the natural amorphous silica filler products uses a "pressed binder matrix" method to measure the silica content. In one such embodiment, about a 3 g sample is added to about 0.75 g of Spectroblend® binder (sold by Chemplex). The mixture is milled by shaking for about 5 minutes in a tungsten carbide mixing vial with an impact ball. The resulting mixture is then pressed in about a 31 mm die to about 24,000 pounds per square inch (about 165 MPa) to form a pellet. Chemical composition is then determined using a Thermo ARL ADVANT'XP XRF spectrometer equipped with about a 60 KV rhodium target X-ray source. In one embodiment, peak intensities from spectra are analyzed by lineshape analysis comparison with single element reference spectra; the peak intensities for the diatomite standards are then converted into pure element count rates that are then used for determining element contents in samples, by peak intensity and data fitting.

Uses for the Natural Amorphous Silica Filler Products

The natural amorphous silica filler products disclosed herein may be used in any application now known to the skilled artisan or hereafter discovered.

Exemplary applications include, but are not limited to, cosmetic formulations, paints, coil coatings, inks, home care products, animal care products, building materials, paper products, fabric products (e.g., textiles), products for personal and work hygiene, contact lenses, chromatography materials, medical equipment, protective topicals, pharmaceutical (e.g., dermatological) formulations, lacquers, coatings, polymers, and plastics.

Additional exemplary applications include, but are not limited to, adhesives and sealants, cleansers, soaps, disinfectants, anti-fouling and paints for inside and outside use, anti-foulant marine coatings, wallpapers, dressings and plasters, prostheses and bone cement, dental fillings, dental prostheses, formulations against gastrointestinal infections, active coal, cat litter, air conditioning (e.g., filters and ducts), air inflated construction (e.g., air halls), agricultural and mulch films, all purpose adhesives, appliances and equipment, appliance adhesives and sealants, aprons, artificial leather, artificial plants, artificial wood, and plastic lumber, Astroturf, automobile parts, automotive and truck upholstery, awnings, bags, bandages, barrier fabrics, bathroom accessories, bathtubs, bathtub cement, bedding, beverage dispensers, bibs, boats, boat covers, book covers, bottles, brush bristles, brush handles, brooms, building components (e.g., walls, wallboard, floors, concrete, siding, roofing, shingles, hardware, carpet cleaner, ceilings and commercial and industrial applications), cable sheathing, caps (e.g., hats), cardboard, carpet and carpet underlay, caster wheels, clinical thermometers, coats, compact discs, convertible tops, cookware, coolers, cooling towers, cooling water, counter and table tops, conveyor belts, countertops, credit cards, crates (for both food and non-food uses), cups, currency, curtains, cushion pads, cutting boards, decking, dishes, dish cloths, dishwasher components, diving equipment or snorkels, drainage sewer pipe, draperies, dry-film paints, exercise equipment, equipment for slaughterhouses or creameries or diaries, equipment for gyms, saunas or massages, fan blades, fiberfill, filters, fittings, fences, floor coverings, floor and carpet baking, flooring, foam (e.g., for cushions and mattresses), food preparation appliances, food and beverage processing equipment, food and drink containers, storage and bags, food handling equipment, food packaging, food and meat crates, food trays and covers, food wrap, footwear (including, for example, boots, sports equipment, and tools), fruit and vegetable brushes, fruit crates, furniture, garbage bags, garbage cans, garment bags, gaskets, general purpose containers, gloves, gowns (e.g., medical and consumer), grease traps, rigid greenhouses, greenhouse films, grout and joint compound, heating, ventilation and air conditioning, hospital surface and medical instrument disinfection, hoses, ice-making equipment and trays, in-can paints, incontinence care products, indoor and outdoor furniture, industrial equipment, inflatable bed, insulation for wire and cable, insulators, intimate apparel, jacket liners, janitorial equipment, kitchen and bathroom hardware, kitchen sinks and fixtures, kitchen towels, laminate and tile adhesives, laying batteries, life vests, liners, mats, mattress cover pads and filing, mattress adhesives, medical and dental apparel, metal working fluids, mineral slurries, mobile homes, mobile toilets, mops, money, natural and synthetic fibers and fabrics, non-woven fabrics, oilfield, outerwear, packaging, pallets, paper products (e.g., wipes, tissues, wall coverings, towels, book covers, mulch), pillow covers, pipes, pipe sealant and insulating materials, plaster, plastics, plastic films, plates and utensils, playground equipment, plumbing supplies and fixtures (e.g., toilet bowl seats), plumbing adhesives and sealants, pool liners, process vessels, protective covers, recreational water, resins, refrigerator components, roofing sheets, membranes, shingles and flashing, ropes, rugs, sales counter, sails, sanitary pipes, sealers, sealing compounds for bathrooms, kitchens or glass, sheets and blankets, shoes, shoe insoles, shower curtains, shower tubs, siding for housing, silage wrap, silos, sinks, siphons, skylights, sleeping bags, sleepwear, socks and hosiery, sponges, sprinkler, sportswear and sports equipment, storage containers, stucco, sun roof, sun shades, synthetic latex polymers, napkins, tanks, tape, tarps, telephone boxes or public phones, tents and other outdoor equipment, ticking (e.g., for mattress pillows), tiles, tile grout, toothbrush handle and bristles, toilet paper and handkerchiefs, toilet blocks and cleaners, towels, toothbrush tumbler, toys, trim for outerwear and garments, trunk liners, tubing, umbrellas, uniforms, undergarments, upholstery, vacuum cleaner bags, wall and floor covering, wallpaper, waste bags, water tanks, waste containers, water treatment, water and ice handling equipment and filters, wet suits, wipes, wire and cable, wood, and wood filled plastics.

In a further embodiment, the natural amorphous silica filler products disclosed herein may be used in plastics and polymers, including but not limited to, synthetic, natural, and semisynthetic organic polymers. Further examples of polymers include, but are not limited to: aliphatic and aromatic polyesters, such as polyethylene terephthalate, polybutylene terephthalate, polyethylene isophthalate, polyhexamethylene terephthalate, polylactic acid, polyglycolic acid, and liquid crystalline polymers for high performance resins and fibers; polyester block copolymers; aliphatic and aromatic polyamides, such as nylon 6, nylon 66, nylon 610, nylon 11, nylon 12, nylon 1212, poly-p-phenylene terephthalamide, poly-m-phenylene isophthalamide; copolymerised polyamides; polyolefins such as polyethylene, polypropylene, and copolymers thereof; vinyl polymers such as polystyrene, polyacrylonitrile, polyvinylalcohol, polyvinyl acetate, polyvinylchloride, polyvinylidene chloride, ABS resins, and acrylic resins; copolymers of ethylene and vinyl acetate; fluorocarbon polymers such as polytetrafluoroethylene, polyvinylidene fluoride and polyvinyl fluoride; polyurethanes; segmented polyurethane elastomers, spandex or elastane elastomers; polyethers such as polyacetals; polyetherimides; polyketones such as polyetherether ketone (PEEK) and polyether ketoneketone (PEKK); polyether and polyester block polymers; polysulfides; polysulfones; polyethersulfones; polyphenylene ether sulfones; polyetherimide sulfones; polysiloxanes such as polydimethyl siloxane; polycarbonates; thermosetting synthetic polymers such as phenol-formaldehyde copolymer, polyurethane, polyesterurethane, polyetherurethane, polyetherurethaneurea, and polyesterurethaneurea; natural polymers such as cellulosics, cotton and wool; and, regenerated or semi-synthetic polymers such as rayon, cuprammonium rayon, acetate rayon, triacetate rayon, reconstituted silk and polysaccharides. Copolymers, terpolymers, and blends of the polymer species listed are also contemplated.

In one embodiment, the natural amorphous silica products can be used as an antiblocking filler in plastics and polymers, including but not limited to polymer films, and provides a potentially lower abrasivity than many other commercial antiblock products. In another embodiment, the natural amorphous silica products can be used as fillers in synthetic and natural rubbers.

In a further embodiment, the natural amorphous silica filler products disclosed herein may be used in flame-resistant thermoplastic resins. These flame-resistant resins can be used in transportation applications, such as for example rail cars and interior cabin parts of airplanes. Exemplary flame-resistant resins include, but are not limited to, polyetherimides, polyimides, polyetherimide sulfones, polysulfones, polyethersulfones, polyphenylene ether sulfones, and siloxane copolymers such as siloxane polyimides.

In another embodiment, the natural amorphous silica products can be used to replace at least a portion of $TiO_2$ in flame-resistant polymer applications. $TiO_2$ is sometimes added to flame-resistant polymers such as polyetherimide (PEI) to improve the optical properties, but can also cause an undesirable increase in heat release characteristics. PEI-Siloxane resins are sometimes added to $TiO_2$ containing PEI resins to lower heat release characteristics, but these can be undesirably expensive.

In contrast, the natural amorphous silica products are thought to have improved heat release characteristics when used in PEI polymers as they form a protective char layer on the surface of the polymer when exposed to heat or flame. The protective char layer acts to prevent resin flow which would otherwise expose new material to the flame and undesirably enhance burn rate, thus resulting in more heat release. The char layer may also provide beneficial thermal insulation properties by trapping heat.

The natural amorphous silica products may present a useful alternative filler to $TiO_2$ due to their lower heat release characteristics. AF silica also has a significantly lower specific gravity than TiO2, so replacement of TiO2 can also provide beneficial reduction in weight, and could potentially lead to increased fuel economy in transportation applications.

In yet another embodiment, the natural amorphous silica products can be used in metal processing applications. For example, in one embodiment, the natural amorphous silica products can be used as used as a component in the molds or cores in foundries that make steel castings, and for casting iron, brass, aluminum and magnesium metals.

In another embodiment, the natural amorphous silica products can be used as an abrasive in polishing applications, such as but not limited to metal, glass, and paint polishing applications.

Unless otherwise indicated to the contrary, all numbers expressing quantities of ingredients, reaction conditions, and so forth used in the specification, including claims, are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, unless otherwise indicated the numerical values set forth in the specific examples are reported as precisely as possible. Any numerical value, however, inherently contain certain errors necessarily resulting from the standard deviation found in their respective testing measurements. The section headings used in this disclosure are provided merely for the convenience of the reader and are not intended to limit the scope of the inventions described herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

By way of non-limiting illustration, examples of certain embodiments of the present disclosure are given below.

EXAMPLES

Example 1

Five natural amorphous silica filler products were made according to the disclosures herein (labeled AF Silica 1532, AF Silica 1974, AF Silica 1457, AF Silica 1974 Fines, and AF Silica 1532 Fines) and compared to conventional natural diatomaceous earth products (Diafil 525, Diafil 570, and CelTiX,), flux calcined diatomaceous earth (Celite 263 LD), nepheline syenite (Minbloc HC1400). Diafil 525, Diafil 570 and CelTiX, for instance, are natural diatomaceous earth products available from World Minerals. Celite 263 LD, for instance, is a flux-calcined diatomaceous earth product available from World Minerals, Inc. Minbloc HC1400 is a product made from nepheline syenite (a mineral similar to feldspar) available from Unimin Corporation.

The natural amorphous silica feed material used to make the natural amorphous silica filler products was obtained from a sedimentary deposit in Chile. The material appeared to be derived from diatomaceous earth, but the original diatom structure had been degraded into fine amorphous silica fragments. The processed natural AF silica feed material had the following properties: $d_{10}$=3.18 µm; $d_{50}$=15.47 µm; $d_{90}$=74.05 µm; L-value=95.41; a-value=0.09; and b-value=2.54.

AF Silica 1532 was produced by multiple classifications on a Micro-Sizer MS-5 classifier, with a classifier wheel speed from 500 rpm to 4000 rpm and an air fan speed from 3000 rpm to 5000 rpm. Multiple classifications were carried out to make products of increasingly narrow particle size distribution. To remove fines, the mineral feed material was de-dusted twice first before the final classification to remove coarse particles. After optimizing the test conditions on classifier wheel speed (1950-3500 rpm for removing fines and 1800 rpm for removing oversize particles) and air fan speed (3900 rpm for removing fines and 4400 rpm for removing oversize particles), a product with a narrow particle size distribution was obtained, as shown in Table 1 below.

AF Silica 1457 was produced by multiple classifications on a Micro-Sizer MS-5 classifier for top size cut or to remove coarse particles, using the parameters discussed above in reference to AF Silica 1532, and an Alpine™ 200 ATP classifier to remove ultra fine particles, with a classifier wheel speed from 5000 rpm to 8000 rpm (actually 5600 rpm) and total air flow pressure from 100 to 400 (actually 380) SCFM (Standard Cubic Feet per Minute).

AF Silica 1974 was produced by multiple classifications on Micro-Sizer MS-5 classifier to remove top cut or coarse particles, using the parameters discussed above in reference to AF Silica 1532, and a laboratory classifier to remove ultra fine particles, with fan speed at 3570 rpm. The fines were collected in the bag house.

Once the natural amorphous silica filler products were made, they were tested against comparable natural diatomaceous earth products and other mineral products, measuring their oil absorption, brightness, porosimetry, chemical composition, color characteristics, crystalline silica content, and anti-block capabilities. Table 1 illustrates the oil absorption and color data for the natural amorphous filler products of the present inventions compared to natural diatomaceous earth products.

TABLE 1

| Sample | $d_{10}$ | $d_{50}$ | $d_{90}$ | $d_{97}$ | L-value | a-value | b-value | Oil Abs (%) |
|---|---|---|---|---|---|---|---|---|
| AF Silica 1974 | 5.1 | 18.5 | 46.2 | 74.0 | 92.42 | 0.02 | 3.67 | 81 |
| AF Silica 1457 | 5.2 | 14.0 | 37.0 | 57.0 | 91.32 | 0.43 | 3.15 | 76 |
| AF Silica 1532 | 6.4 | 15.1 | 31.8 | 48.0 | 93.12 | 0.24 | 2.68 | 81 |
| AF Silica 1974 fines | 2.0 | 6.3 | 19.3 | 33.9 | 95.09 | 0.00 | 3.50 | 95 |
| AF Silica 1532 fines | 1.6 | 4.7 | 13.1 | 20.2 | 96.47 | 0.18 | 2.33 | 89 |
| Diafil 525 | 5.7 | 12.9 | 26.1 | 48.0 | 90.89 | 0.41 | 7.18 | 135 |
| Diafil 570 | 3.7 | 9.1 | 18.7 | 28.5 | 92.00 | 0.33 | 6.79 | 127 |
| CelTiX | 4.9 | 13.6 | 28.8 | 48.0 | 93.16 | 0.20 | 4.53 | 150 |

The oil absorption data listed in Table 1 was determined on a weight basis using the method described above. The color data of each sample listed in Table 1 was collected on a Spectro/plus Spectrophotometer using the method described above. As shown in Table 1, the natural amorphous silica filler products have lower oil absorption and better color characteristics than comparable natural DE products.

Table 2 illustrates the porosimetry data for three of the natural amorphous filler products made in this of the present inventions compared to one of the natural diatomaceous earth products.

TABLE 2

| Sample | Pore Volume (mL/g) | Median Pore Diameter (µm) | Surface Area (m²/g) |
|---|---|---|---|
| AF Silica 1974 | 1.4 | 2.1 | 7.1 |
| AF Silica 1532 | 1.3 | 2.3 | 6.0 |
| AF Silica 1974 fines | 2.0 | 1.5 | — |
| Diafil 525 | 2.1 | 2.2 | 31.0 |

Figure 5:
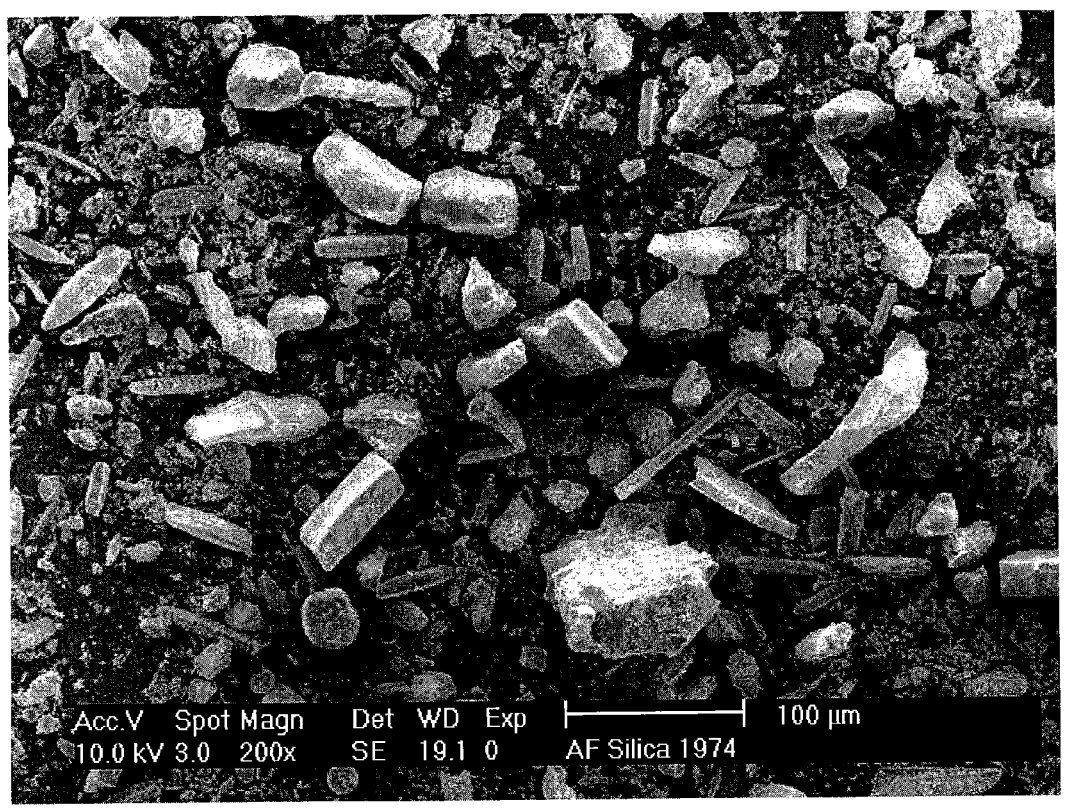
FIG. 5 is a scanning electron microscope image of AF Silica 1974 under 200× magnification.

Pore volume was measured with an AutoPore IV 9500 series mercury porosimeter from Micromeritics Instrument Corporation (Norcross, Ga., USA), using the method described above. BET surface area was measured with a Gemini III 2375 Surface Area Analyzer, using the method described above. The natural amorphous silica filler products have a lower surface area and are less porous than the compared natural diatomaceous earth product. The large particle size samples (AF Silica 1974 and 1532) also have large pores compare to AF Silica 1974 Fines, as may be seen through a comparison of FIGS. 1-4 (AF Silica 1974 Fines) and FIG. 5 (AF Silica 1974).

Table 3 illustrates the chemical composition data for four of the natural amorphous filler products of this example compared to one of the natural diatomaceous earth products.

TABLE 3

| | $SiO_2$ | $Al_2O_3$ | $Fe_2O_3$ | $Na_2O$ | $K_2O$ | CaO | MgO |
|---|---|---|---|---|---|---|---|
| AF Silica 1974 | 95.14 | 1.58 | 0.38 | 0.62 | 0.51 | 1.05 | 0.08 |
| AF Silica 1532 | 96.69 | 1.32 | 0.19 | 0.50 | 0.30 | 0.55 | 0.06 |
| AF Silica 1974 fines | 95.93 | 1.35 | 0.35 | 0.51 | 0.39 | 0.91 | 0.09 |
| AF Silica 1532 fines | 97.16 | 1.11 | 0.18 | 0.45 | 0.24 | 0.46 | 0.06 |
| Diafil 525 | 92.61 | 3.20 | 1.49 | 0.36 | 0.40 | 1.17 | 0.44 |

X-Ray Fluorescence (XRF) analysis was performed on the high brightness natural amorphous silica filler product, using the method described above. The data illustrates in Table 3 illustrates that the natural amorphous silica filler products have low iron content (which contributes to the high brightness and low yellowness in the AF Silica samples) and high silica content compared to Diafil 525.

Table 4 illustrates the anti-block characteristics for the certain natural amorphous filler products of this example compared to the commercial antiblock products Celite 263LD (flux calcined diatomaceous earth available from World Minerals, Inc.) and Minbloc HC1400 (nepheline syenite available from Unimin Corporation).

TABLE 4

| Sample ID | $d_{10}$ | $d_{50}$ | $d_{90}$ | L-value | a-value | b-value | Induced Blocking (g) | Haze % |
|---|---|---|---|---|---|---|---|---|
| AF Silica 1532 | 6.4 | 15.1 | 31.8 | 93.12 | 0.24 | 2.68 | 20.8 | 7.6 |
| Celite 263LD | 5.4 | 12.2 | 22.8 | 96.59 | 0.09 | 1.31 | 26.5 | 5.9 |
| Minbloc HC 1400 | 1.6 | 7.6 | 14.4 | 95.44 | −0.06 | 1.23 | 30.2 | 5.4 |

Anti-block performance in polyethylene films containing 2000 ppm of the each product sample was measured, using the process described above. Table 4 shows that the exemplary natural amorphous silica filler product has utility in anti-blocking applications. Induced blocking is a measure of how much the films stick to each other, and lower values are generally better for an anti-block application. This data illustrates that the natural amorphous silica filler products perform slightly better in anti-blocking compared to several conventional commercial anti-block materials.

Table 5 illustrates the crystalline silica content for the natural amorphous filler products of this example.

TABLE 5

| Sample ID | Cristobalite (%) | Quartz (%) |
|---|---|---|
| AF Silica 1532 | <0.3 | 0.52 |
| AF Silica 1532 fines | <0.3 | 0.08 |
| AF Silica 1457 | <0.3 | 0.75 |
| AF Silica 1457 fines | <0.3 | 0.10 |
| AF Silica 1974 | <0.3 | 0.60 |
| AF Silica 1974 fines | <0.3 | 0.21 |
| C263LD | 39.7 | 0.3 |

The results presented in Table 5 confirm the low crystalline silica content in the AF Silica products. Crystalline silica content of cristobalite and quartz was determined using the methods described above.

Table 6 illustrates the paint color characteristics and matting performance for the certain natural amorphous filler products of this example as compared to a natural diatomaceous earth product.

TABLE 6

| Sample ID | % | Formulation | Whiteness | Yellowness | 60° Gloss | 85° Sheen | Scrub Resistance |
|---|---|---|---|---|---|---|---|
| AF Silica 1457 | 3.7 | 42 PVC | 87.4 | 2.1 | 2.1 | 2.1 | >1000 |
| AF Silica 1974 | 3.7 | 42 PVC | 87.2 | 2.3 | 2.2 | 2.1 | >1000 |
| Diafil 525 | 3.7 | 42 PVC | 84.9 | 3.3 | 2.1 | 2.1 | >1000 |
| AF Silica 1457 | 4.1 | 56 PVC | 90.5 | 2.0 | 2.4 | 5.5 | 675 |
| AF Silica 1974 | 4.1 | 56 PVC | 90.2 | 2.1 | 2.4 | 5.4 | 669 |
| Diafil 525 | 4.1 | 56 PVC | 88.2 | 3.0 | 2.4 | 5.2 | 588 |

Table 6 shows the paint test results in 42 and 56 PVC (Pigment Volume Concentration) formulations. The paint results indicate that the matting efficiency for the tested natural amorphous silica filler products is similar to the Diafil 525, but the exemplary natural amorphous silica filler products are significantly whiter and less yellow with high scrub resistance (in 56 PVC). A Datacolor 550 Spectrophotometer (Datacolor, Lawrenceville, N.J.) was used to measure the color of the paint draw-downs. Whiteness and yellowness were calculated based on ASTM E313. Scrub resistance, referring to the ability of the surface of a material to resist being worn away or to maintain its original appearance when rubbed, was measured based on ASTM D2486-89. PVC was calculated using the following formula:

$$PVC = \frac{\text{Total sum by volume of all pigments} + \text{extenders in paint}}{\text{Total sum by volume of each solid ingredient in paint}} \times 100$$

Example 2

One test commonly used to evaluate the flame resistance of resins is the Federal Aviation Regulation (FAR) 25.853 test (sometimes referred to as the Ohio State University (OSU) rating). In this test, the time for a polymer sample to reach peak heat release, the amount of energy released after 2 minutes and the peak heat release energy are measured. Lower heat release values and longer time to reach peak heat release are desirable.

In this example, samples were prepared by extrusion of mixtures of AF Silica 1532 Fines with Ultem 1000 polyetherimide (PEI) resin (available from SABIC Innovative Plastics) in a 2.5 inch single screw, vacuum vented extruder. Compositions are listed in wt % of the total composition except where noted otherwise. The extruder was set at about 285 to 340° C. The blends were run at about 90 rpm under vacuum. The extrudate was cooled, pelletized, and dried at 120° C. Test samples were injection molded at a set temperature of 320-360° C. and mold temperature of 120° C. using a 30 second cycle time.

Flexural modulus and strength were measured on 3.2 mm bars as per ASTM method D790.

Heat release testing was done on 15.2×15.2 cm plaques 2.0 mm thick using the Ohio State University (OSU) rate-of-heat release apparatus, as measured by the method listed in FAR 25.853 (d). Heat release was measured at two-minutes in kW-min/m² (kilowatt minutes per square meter). The peak heat release was measured as kW/m² (Kilowatt per square meter). The heat release test method is also described in the "Aircraft Materials Fire Test Handbook" DOT/FAA/AR-00/12, Chapter 5 "Heat Release Test for Cabin Materials".

TABLE 7

| Property Measured | Polyetherimide (PEI) | PEI + 1% AF Silica (AFS) | PEI + 5% AFS | PEI + 10% AFS | PEI + 20% AFS | PEI + 5% TiO$_2$ | PEI + 10% TiO$_2$ |
|---|---|---|---|---|---|---|---|
| Specific Gravity | 1.286 | 1.29 | 1.306 | 1.326 | 1.37 | 1.329 | 1.386 |
| Flexural Modulus (MPa) | 3409 | 3446 | 3655 | 3972 | 4846 | 3518 | 3668 |
| Flexural Strength (MPa) | 141.7 | 143.8 | 152.7 | 160.7 | 155.8 | 148.8 | 149.4 |
| 2 min Heat release (KW min/m$^2$) | 8 | 6 | 7 | 3 | 11 | 7 | 9 |
| Peak Heat release (KW/m$^2$) | 58 | 50 | 50 | 49 | 49 | 50 | 49 |

Table 7 shows that use of the AF silica ("AFS") product as a filler in PEI provides beneficial results on heat release properties in comparison to PEI samples including comparable amounts of TiO$_2$. TiO$_2$ is generally added to PEI to improve color and optical properties, however such addition of TiO$_2$ may have undesirable effects on heat release, which can require addition of expensive siloxane copolymer to reduce heat release. As shown in Table 7, addition of 10% AF silica can result in a substantial reduction of 2 minute heat release in comparison to PEI with 10% TiO$_2$, or even PEI alone.

What is claimed is:

1. An amorphous natural silica composition having a median particle diameter of not greater than about 20 microns, an oil absorption of not greater than about 100% by weight, an L-value of not less than about 90, and a crystalline silica content of not greater than about 1 by weight,
    wherein the amorphous natural silica composition comprises a diatomaceous earth-derived material having a diatom structure degraded into fine amorphous silica fragments classified to obtain the median particle diameter, and
    wherein the amorphous natural silica composition is surface-treated.

2. The composition of claim 1, wherein the composition comprises not less than about 90% of SiO$_2$ by weight.

3. The composition of claim 2, wherein the composition comprises not less than about 95% of SiO$_2$ by weight.

4. The composition of claim 1, wherein the composition comprises not greater than about 1% of Fe$_2$O$_3$ by weight.

5. The composition of claim 1, wherein the composition comprises not greater than about 2% of Al$_2$O$_3$ by weight.

6. The composition of claim 1, wherein the composition comprises an alkali content of not greater than about 5% by weight.

7. The composition of claim 1, wherein the composition comprises not greater than about 0.5% of cristobalite by weight and not greater than about 1% of quartz by weight.

8. The composition of claim 1, wherein the median particle diameter is not greater than about 5 microns.

9. The composition of claim 1, wherein the composition has a d$_{90}$ of not greater than about 50 microns.

10. The composition of claim 1, wherein the composition has a d$_{97}$ of not greater than about 80 microns.

11. The composition of claim 1, wherein the composition has an oil absorption not greater than about 85% by weight.

12. The composition of claim 1, wherein the composition has an average pore volume of not greater than about 3 mL/g.

13. The composition of claim 1, wherein the composition has a median pore diameter of not greater than about 3 microns.

14. The composition of claim 1, wherein the composition has a surface area not greater than about 8 m$^2$/g.

15. The composition of claim 1, further comprising at least one adhered silane polymer matrix.

16. The composition of claim 1, further comprising at least one basic organic compound.

17. An amorphous natural silica composition having a median particle diameter d$_{50}$ of not greater than about 20 microns, a d$_{97}$ of not greater than about 80 microns, an L-value of not less than about 95, and a crystalline silica content of not greater than about 1%,
    wherein the amorphous natural silica composition comprises a diatomaceous earth-derived material having a diatom structure degraded into fine amorphous silica fragments classified to obtain the median particle diameter, and
    wherein the amorphous natural silica composition is surface-treated.

18. The composition of claim 17, wherein the L-value is not less than about 96.

19. The composition of claim 18, wherein the composition has a b-value of not greater than about 4.

20. The composition of claim 19, wherein the composition has an a-value of not more than about 0.5.

21. A polymer composition comprising an amorphous natural silica composition having a median particle diameter of not greater than about 20 microns, an oil absorption of not greater than about 100% by weight, an L-value of not less than about 90, and a crystalline silica content of not greater than about 1% by weight,
    wherein the amorphous natural silica composition comprises a diatomaceous earth-derived material having a diatom structure degraded into fine amorphous silica fragments classified to obtain the median particle diameter, and
    wherein the amorphous natural silica composition is surface-treated.

22. The polymer composition of claim 21, wherein said polymer is selected from polyetherimides, polyimides, polyetherimide sulfones, polysulfones, polyethersulfones, polyphenylene ether sulfones, and siloxane copolymers.

23. The amorphous natural silica composition of claim 1, wherein the amorphous natural silica composition is surface-treated with a color enhancing agent.

24. The amorphous natural silica composition of claim 1, wherein the amorphous natural silica composition is surface-treated with a color enhancing agent comprising ultramarine blue.

25. The amorphous natural silica composition of claim 21, wherein the amorphous natural silica composition is surface-treated with a color enhancing agent.

26. The amorphous natural silica composition of claim 21, wherein the amorphous natural silica composition is surface-treated with a color enhancing agent comprising ultramarine blue.

* * * * *